(12) United States Patent
Yoon

(10) Patent No.: US 9,911,455 B2
(45) Date of Patent: Mar. 6, 2018

(54) SPINDLE MOTOR

(71) Applicant: LG INNOTEK CO., LTD., Seoul (KR)

(72) Inventor: Hoeop Yoon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 359 days.

(21) Appl. No.: 14/598,899

(22) Filed: Jan. 16, 2015

(65) Prior Publication Data

US 2015/0143388 A1 May 21, 2015

Related U.S. Application Data

(63) Continuation of application No. 14/104,856, filed on Dec. 12, 2013, now Pat. No. 8,963,386, which is a
(Continued)

(30) Foreign Application Priority Data

Nov. 18, 2010 (KR) .......................... 10-2010-0115160

(51) Int. Cl.
*H02K 5/16* (2006.01)
*G11B 19/20* (2006.01)
(Continued)

(52) U.S. Cl.
CPC ......... *G11B 19/2009* (2013.01); *H02K 1/187* (2013.01); *H02K 5/00* (2013.01);
(Continued)

(58) Field of Classification Search
CPC ....... H02K 5/00; H02K 5/163; H02K 2203/03
(Continued)

(56) References Cited

U.S. PATENT DOCUMENTS 5,864,443 A 1/1999 Elsaesser et al.
8,008,819 B2 8/2011 Mizukami
(Continued)

FOREIGN PATENT DOCUMENTS

CN 1455502 A 11/2003
CN 2930079 Y 8/2007
(Continued)

OTHER PUBLICATIONS

Office Action dated Oct. 19, 2016 in Chinese Application No. 201410397267.9.
(Continued)

*Primary Examiner* — Hanh Nguyen
(74) *Attorney, Agent, or Firm* — Saliwanchik, Lloyd & Eisenschenk

(57) ABSTRACT

A spindle motor is provided, the motor comprising: a base plate, a PCB on the base plate, a bearing assembly arranged on the base plate, a stator coupled to a periphery of the bearing assembly, a rotor rotationally coupled to the bearing assembly, the rotor including a yoke and a magnet, and a rotation shaft rotationally coupled to the bearing assembly. The base plate includes a planar portion and a protruding portion arranged along with a periphery of the yoke, the protruding portion being apart from the yoke. The base plate is partially covered with the PCB in a region where the stator is arranged. And, a height from the planar portion to an upper surface of the protruding portion is smaller than a height from the planar portion to a lower surface of the periphery of the yoke.

20 Claims, 4 Drawing Sheets

Related U.S. Application Data continuation of application No. 14/054,333, filed on Oct. 15, 2013, now Pat. No. 8,963,385, which is a continuation of application No. 13/299,661, filed on Nov. 18, 2011, now Pat. No. 8,587,166.

(51) Int. Cl.
*H02K 1/18* (2006.01)
*H02K 5/00* (2006.01)
*H02K 5/10* (2006.01)
*H02K 11/33* (2016.01)

(52) U.S. Cl.
CPC .............. *H02K 5/10* (2013.01); *H02K 5/163* (2013.01); *H02K 5/165* (2013.01); *H02K 11/33* (2016.01); *H02K 2203/03* (2013.01)

(58) Field of Classification Search
USPC .................................... 310/88, 89, 90, 67 R
See application file for complete search history.

(56) References Cited

U.S. PATENT DOCUMENTS

| | | | |
|---|---|---|---|
| 8,120,217 B2 | 2/2012 | Yawata et al. | |
| 8,321,883 B2 | 11/2012 | Smirnov et al. | |
| 8,324,767 B2 | 12/2012 | Lee | |
| 8,587,166 B2 | 11/2013 | Yoon | |
| 8,963,386 B2* | 2/2015 | Yoon ................. | G11B 19/2009 310/67 R |
| 2002/0117909 A1 | 8/2002 | Gomyo | |
| 2004/0000828 A1 | 1/2004 | Kobayashi et al. | |
| 2004/0189113 A1* | 9/2004 | Kuribara .............. | F04D 29/051 310/67 R |
| 2005/0111769 A1 | 5/2005 | Haga | |
| 2008/0018187 A1 | 1/2008 | Yamaguchi et al. | |
| 2008/0169733 A1 | 7/2008 | Lin et al. | |
| 2008/0309204 A1 | 12/2008 | Yamada | |
| 2009/0309438 A1 | 12/2009 | Horng et al. | |
| 2010/0148606 A1 | 6/2010 | Yu et al. | |
| 2011/0075298 A1 | 3/2011 | Kull et al. | |

FOREIGN PATENT DOCUMENTS

| | | |
|---|---|---|
| CN | 101312313 A | 11/2008 |
| CN | 101335474 A | 12/2008 |
| CN | 101493098 A | 7/2009 |
| CN | 101507087 A | 8/2009 |
| CN | 101751953 A | 6/2010 |
| CN | 102468715 A | 5/2012 |
| JP | 63-40172 U | 3/1988 |
| JP | 9-261909 A | 10/1997 |
| JP | H-1023701 A | 1/1998 |
| JP | 10-52016 A | 2/1998 |
| JP | 6340172 U | 3/1998 |
| JP | 11-285199 A | 10/1999 |
| JP | 2001057755 A | 2/2001 |
| JP | 2004015918 A | 1/2004 |
| JP | 2008109793 A | 5/2008 |
| KR | 100722630 B1 | 5/2007 |
| KR | 20100003863 U | 4/2010 |
| KR | 100968277 B1 | 7/2010 |

OTHER PUBLICATIONS

Office Action dated May 3, 2016 in Chinese Application No. 201410394893.2.
Office Action dated Apr. 1, 2016 in Chinese Application No. 201410394863.1.
Request for an Invalidation Trial (With English Translation).
Supplementary Request for Invalidation Trial (With English Translation).
Sealing Technology, compiled by Liu Hougui, 1981, pp. 697-710, Changsha: Hunan Science & Technology Press, National Library of China. (With English Translation).

\* cited by examiner

SPINDLE MOTOR

CROSS-REFERENCE TO RELATED APPLICATIONS

This application is a continuation of U.S. patent application Ser. No. 14/104,856, filed Dec. 12, 2013; which is a continuation of U.S. patent application Ser. No. 14/054,333, filed Oct. 15, 2013; which is a continuation of U.S. patent application Ser. No. 13/299,661, filed Nov. 18, 2011, now U.S. Pat. No. 8,587,166, issued Nov. 19, 2013; which claims the benefit under 35 U.S.C. § 119 of Korean Application No. 10-2010-0115160, filed Nov. 18, 2010, which are hereby incorporated by reffgerence in their entirety.

BACKGROUND

The present disclosure generally relates to a spindle motor.

A spindle motor performs a function of rotating a disk to enable an optical pickup which linearly reciprocates in an optical disk drive ODD and a hard disk to read a large amount of data recorded on the disk. The ODDs have been recently developed to stably rotate an optical disk at a high speed.

The ODD includes a spindle motor for rotating an optical disk at a high speed, an optical pickup module for reading out data from a disk rotating at a high speed or recording the data on the disk, and a stepping motor for driving the optical pickup module.

The spindle motor rotating the optical disk at a high speed includes a bearing rotationally supporting a rotation shaft, a bearing housing accommodating the bearing, a stator secured at a periphery of the bearing housing, a rotor rotationally accommodated on the bearing, a base plate fixing the bearing housing and a circuit substrate arranged at an upper surface of the base plate.

A gap is formed between an upper surface of the base plate and the stator according to a conventional spindle motor to disadvantageously introduce foreign objects. In order to reduce the gap formed between the stator and the upper surface of the base plate, the circuit substrate arranged on the upper surface of the base plate is unnecessarily extended to a bottom surface of the stator. If the circuit substrate is extended to between the stator and the base plate, inflow of foreign objects into the base plate and the stator may be reduced to a certain degree. However, a problem occurs in which an area of the high-priced circuit substrate disadvantageously increases to increase a manufacturing cost of the spindle motor.

BRIEF SUMMARY

Exemplary embodiments of the present disclosure provide a spindle motor configured to reduce a manufacturing cost by dispensing with unnecessary extension of a circuit substrate into between a stator and a base plate and by preventing foreign objects from entering the stator and the base plate.

In one general aspect of the present disclosure, there is provided a spindle motor, comprising: a base plate; a PCB on the base plate; a bearing assembly arranged on the base plate; a stator coupled to a periphery of the bearing assembly; a rotor rotationally coupled to the bearing assembly, the rotor including a yoke and a magnet; and a rotation shaft rotationally coupled to the bearing assembly, wherein the base plate includes a planar portion and a protruding portion arranged along with a periphery of the yoke, the protruding portion being apart from the yoke, wherein the base plate may be partially covered with the PCB in a region where the stator is arranged, and wherein a height from the planar portion to an upper surface of the protruding portion may be smaller than a height from the planar portion to a lower surface of the periphery of the yoke.

In some exemplary of the present invention, the PCB may include an exposure unit exposing a part of the base plate opposite to the stator, and the protruding portion prevents foreign objects from entering to the exposure unit.

In some exemplary of the present invention, the base plate may include a first through hole to be coupled to the bearing assembly, and the PCB includes a second through hole formed at a position corresponding to that of the first through hole and partially opened toward the protruding portion.

In some exemplary of the present invention, the protruding portion may include a shape of a curved line when viewed in a top plane.

In some exemplary of the present invention, the protruding portion may have the same curvature as that of a core of the stator.

In some exemplary of the present invention, the height from the planar portion to the upper surface of the protruding portion may be the same as thickness of the PCB.

In some exemplary of the present invention, the protruding portion may protrude with a right angle relative to the planar portion.

In some exemplary of the present invention, the height from the planar portion to the upper surface of the protruding portion may be higher than the thickness of the PCB.

In some exemplary of the present invention, the protruding portion may protrude with an obtuse angle relative to the planar portion.

In some exemplary of the present invention, the protruding portion may protrude with an acute angle relative to the planar portion.

In some exemplary of the present invention, the protruding portion may be integrally formed with the planar portion.

In some exemplary of the present invention, the protruding portion may be integrally formed with the planar portion by bending a part of the base plate.

In some exemplary of the present invention, the protruding portion may include a semi-circular shape when viewed in a top plane.

In some exemplary of the present invention, the bearing assembly may include a bearing housing and a bearing inserted into the bearing housing, the stator may include a core including radially formed core pieces and a coil wound on the core pieces, and the rotor may include the magnet opposite to the core pieces and the yoke fixing the magnet and coupled to the rotation shaft inserted into the bearing.

In some exemplary of the present invention, the PCB may be formed with a through hole through which the bearing assembly passes, and a diameter of the through hole may be larger than that of the bearing assembly, and the through hole may be partially opened.

In another general aspect of the present disclosure, there is provided a spindle motor, comprising: a base plate; a PCB on the base plate; a bearing assembly arranged on the base plate; a stator coupled to a periphery of the bearing assembly; a rotor rotationally coupled to the bearing assembly, the rotor including a yoke and a magnet; and a rotation shaft rotationally coupled to the bearing assembly, wherein the yoke may include an upper plate and a lateral plate, wherein the base plate may include a planar portion and a protruding portion arranged along with the lateral plate of the yoke, and wherein the protruding portion may be configured to have a gap between the protruding portion and a lower surface of the lateral plate of the yoke.

In some exemplary of the present invention, the PCB may be partially arranged on the base plate in a region where the rotor is arranged.

In some exemplary of the present invention, the base plate may include a first through hole to be coupled to the bearing assembly, and the PCB may include a second through hole formed at a position corresponding to that of the first through hole and partially opened toward the protruding portion.

In some exemplary of the present invention, the protruding portion may include a shape of a curved line when viewed in a top plane.

In some exemplary of the present invention, the protruding portion may have the same curvature as that of a core of the stator.

In some exemplary of the present invention, a height from the planar portion to an upper surface of the protruding portion may be the same as thickness of the PCB.

In some exemplary of the present invention, a height from the planar portion to an upper surface of the protruding portion may be higher than the thickness of the PCB.

In some exemplary of the present invention, the protruding portion may protrude with an obtuse angle relative to the planar portion.

In some exemplary of the present invention, the protruding portion may protrude with an acute angle relative to the planar portion.

In some exemplary of the present invention, the protruding portion may be integrally formed with the planar portion.

In some exemplary of the present invention, the protruding portion may be integrally formed with the planar portion by bending a part of the base plate.

In some exemplary of the present invention, the protruding portion may include a semi-circular shape when viewed in a top plane.

In some exemplary of the present invention, the bearing assembly may include a bearing housing and a bearing inserted into the bearing housing, the stator may include a core including radially formed core pieces and a coil wound on the core pieces, and the rotor may include the magnet opposite to the core pieces and the yoke fixing the magnet and coupled to the rotation shaft inserted into the bearing.

In some exemplary of the present invention, the PCB may be formed with a through hole through which the bearing assembly passes, and a diameter of the through hole is larger than that of the bearing assembly, and the through hole may be partially opened.

The spindle motor according to the exemplary embodiments of the present disclosure has an advantageous effect in that an exposure unit is formed at a part of a PCB interposed between a base plate and a core of a stator to reduce a manufacturing cost of the PCB, and foreign objects introduced through the exposure unit is prevented by a foreign object inflow prevention fence formed at the base plate to avoid the spindle motor from being polluted by the foreign objects.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

DETAILED DESCRIPTION

Figure 1:
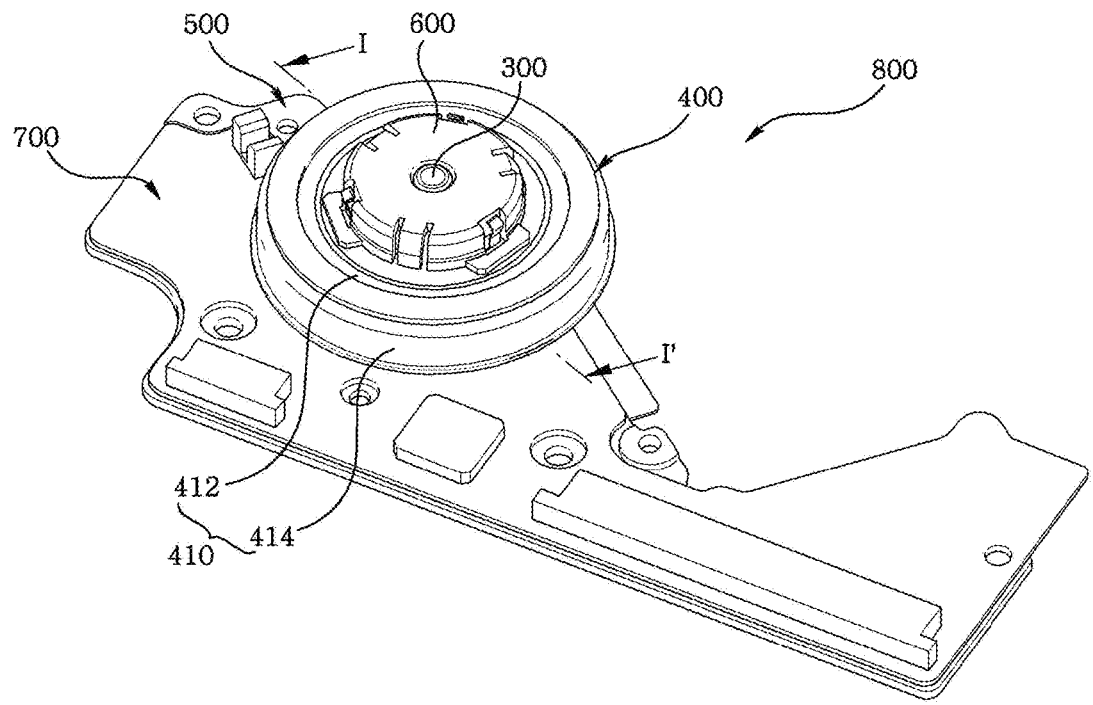
FIG. 1 is a perspective view of a spindle motor according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. The meaning will be clear from the context of the description. Like numbers refer to like elements throughout, and explanations that duplicate one another will be omitted.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Figure 2:
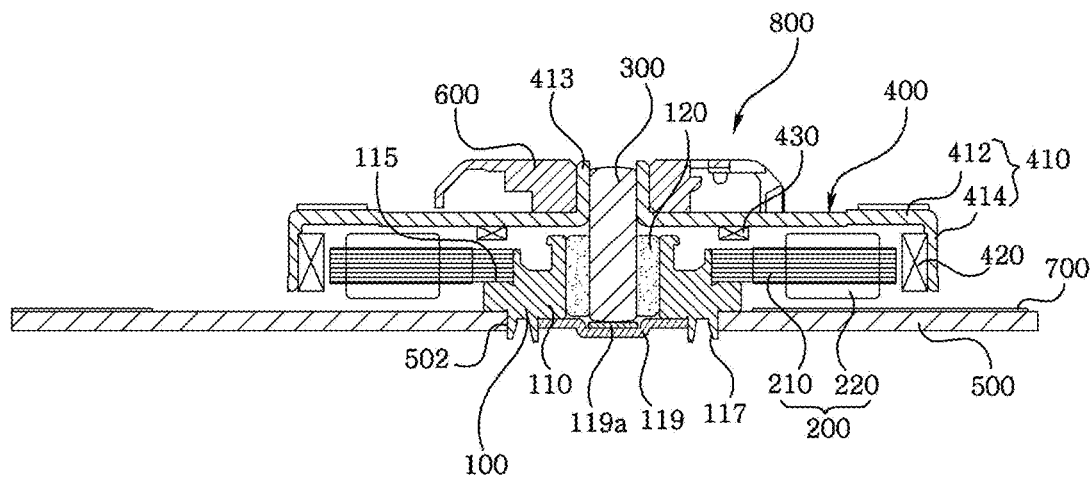
FIG. 2 is a cross-sectional view taken along line 1-1' of FIG. 1.
Figure 3:
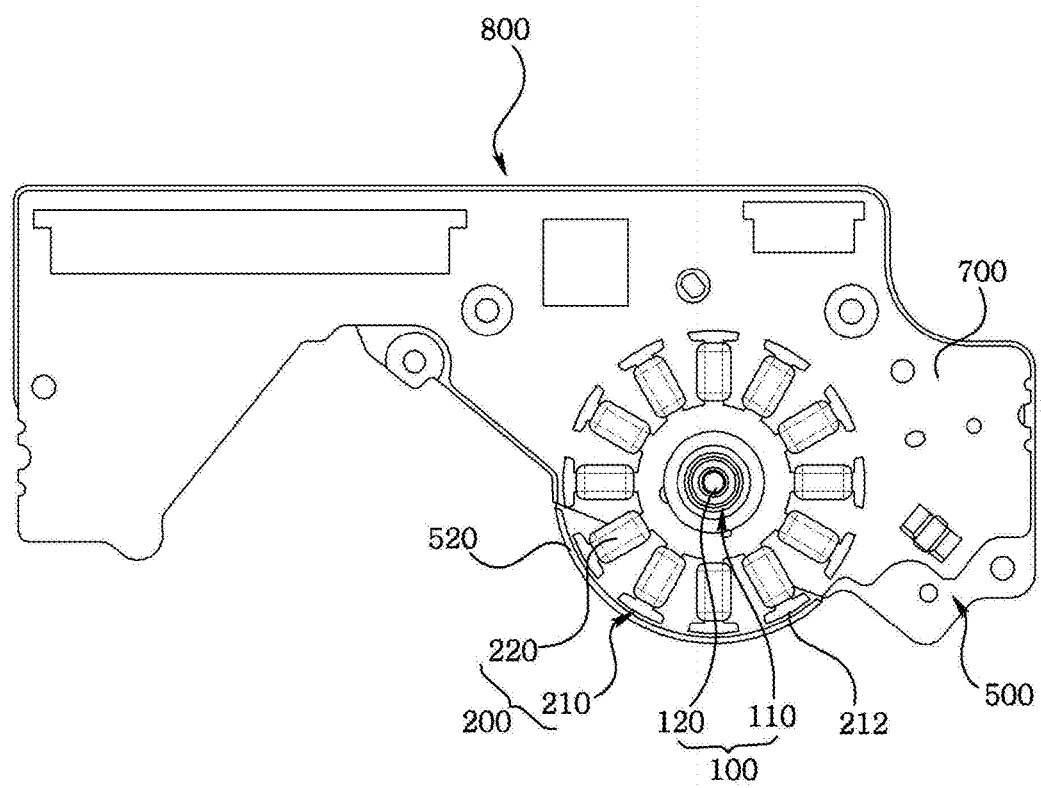
FIG. 3 is a plane view illustrating a spindle motor of FIG. 1 removed of a rotation shaft and a rotor.
Figure 4:
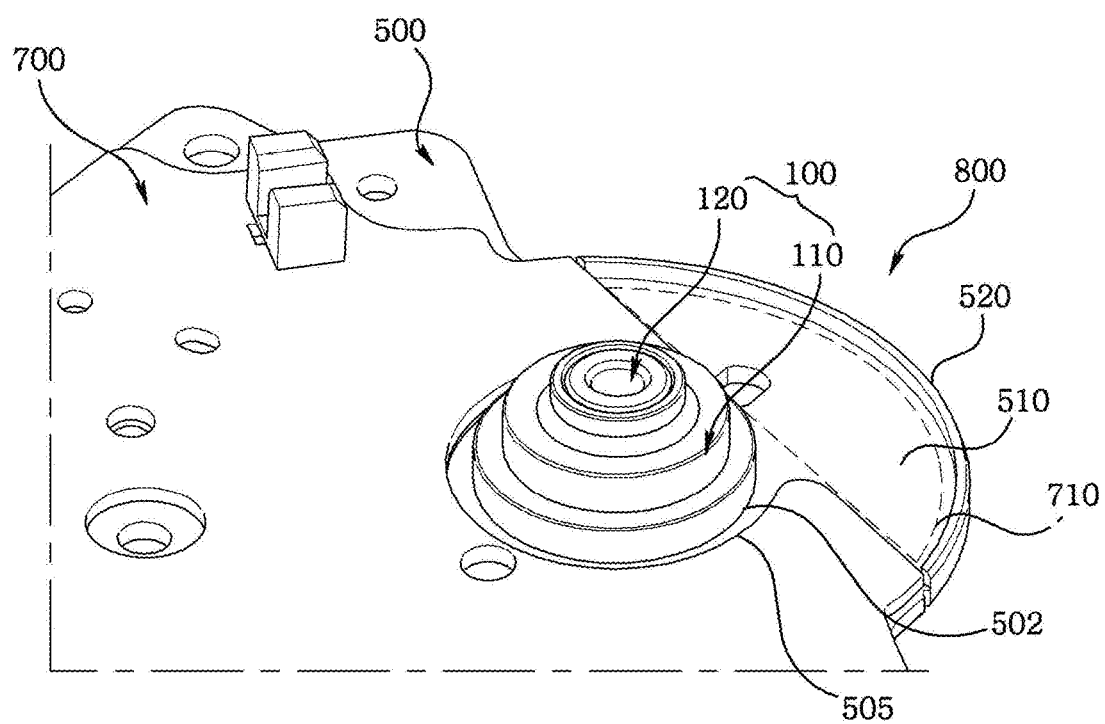
FIG. 4 is a partially enlarged perspective view illustrating a spindle motor of FIG. 3 removed of a stator.
Figure 5:
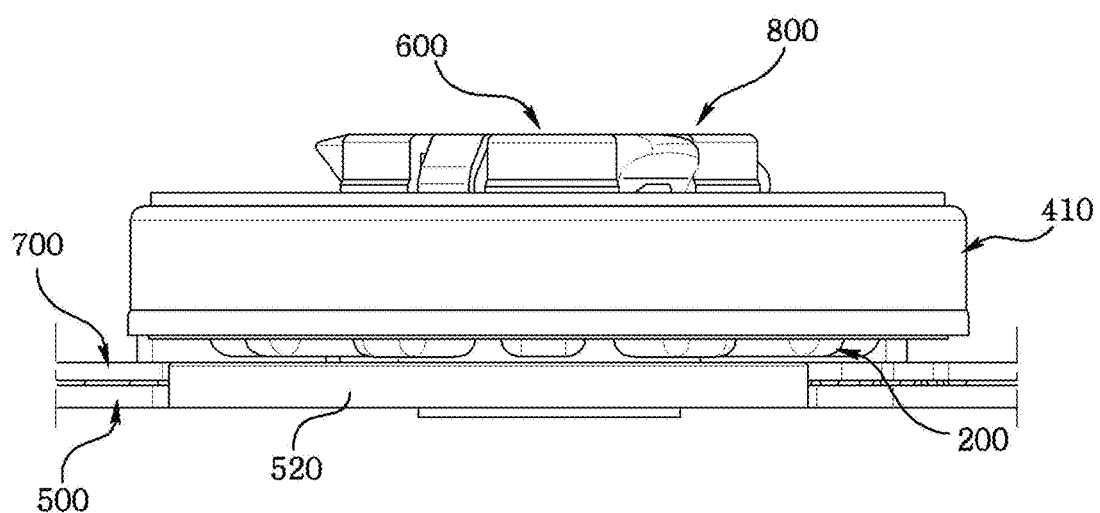
FIG. 5 is a lateral view of FIG. 1.

FIG. 1 is a perspective view of a spindle motor according to an exemplary embodiment of the present disclosure, FIG. 2 is a cross-sectional view taken along line 1-1' of FIG. 1, FIG. 3 is a plane view illustrating a spindle motor of FIG. 1 removed of a rotation shaft and a rotor, FIG. 4 is a partially enlarged perspective view illustrating a spindle motor of FIG. 3 removed of a stator, and FIG. 5 is a lateral view of FIG. 1.

Referring to FIGS. 1 to 5, a spindle motor 800 includes a bearing assembly 100, a stator 200, a rotation shaft 300, a rotor 400, a base plate 500 and a PCB Printed Circuit Board, 700. In addition, the spindle motor 800 may further include a clamp 600.

The bearing assembly 100 includes a bearing housing 110 and a bearing 120. The bearing housing 110 takes a shape of a hollow hole-formed cylinder, for example, and the bearing housing 110 is formed at an upper corner with a staircase sill 115 for securing a core described later. The bearing housing 110 is protruded at a rear surface with a coupling lug 117 for being coupled with the base plate 500, described later.

The bearing housing 110 is arranged at a bottom surface with a support plate 119 for supporting a bottom end of the rotation shaft 300, described later, and a portion contacting a bottom end of the rotation shaft 300 in the support plate 119 is formed with a thrust bearing 119a.

The bearing 120 takes a shape of a cylinder inserted into the bearing housing 110, and is formed with a rotation shaft hole for being coupled with the rotation shaft. In the exemplary embodiment of the present disclosure, the bearing 120 may include an oil sintered impregnation bearing.

The stator 200 includes a core 210 and a coil 220. The core 210 is formed by stacking a plurality of iron pieces each having an opening, and secured to the staircase sill 115 of the bearing housing 100. In the exemplary embodiment of the present disclosure, the core 210 includes core units 212, where the core units 212 are formed by being radially protruded, and the core 210 including the core units 212 takes a shape of a disk when viewed in a top plane.

In the exemplary embodiment of the present disclosure, a part of the core 210 including the core units 212 may be arranged to protrude from an edge of the base plate 500. The coil 220 is wound on the core unit 212 formed at the core 210.

The rotation shaft 300 is inserted into the rotation shaft hole of the bearing 120 at the bearing assembly 100, and a bottom end of the rotation shaft 300 is brought into contact with the thrust bearing 119a supported by the support plate 119.

The rotor 400 includes a yoke 410 and a magnet 420. In addition, the rotor 400 may further include a suction magnet 430. The yoke 410 may include a yoke upper plate 412 and a yoke lateral plate 414.

The yoke upper plate 412, when viewed from a top plane, takes a shape of a disk, and is centrally formed with a cylindrically shaped yoke burring unit 413 towards an upper surface of the yoke upper plate 412. The yoke burring unit 413 is press-fitted into the rotation shaft 300.

The yoke lateral plate 414 is downwardly extended from the yoke upper plate 412 and a void is formed inside the yoke 410 by the yoke lateral plate 414 and the yoke upper plate 412.

The magnet 420 is formed along an inner lateral surface of the yoke lateral plate 414, and a rotational force is generated on the yoke 410 and the rotation shaft 300 by attractive force and repulsive force generated a magnetic field generated by the coil 220 wound on the core unit 212 of the core 210 and a magnetic field generated by the magnet 420. The yoke upper plate 412 of the yoke 410 is arranged with a clamp 600 for chucking an optical disk.

Meantime, a suction magnet 430 may be arranged at any one place of an inner lateral surface of the yoke upper plate 412 and an upper surface of the core 210 opposite to the inner lateral surface of the yoke upper plate 412.

In the exemplary embodiment of the present disclosure, the suction magnet 430 may be arranged at the inner lateral surface of the yoke upper plate 412, for example, and the suction magnet 430 arranged at the inner lateral surface pulls the core 210 using the magnetic force to stably rotate the rotor 400.

Referring to FIGS. 2, 3 and 4 again, the base plate 500 is formed by processing a metal plate. The base plate 500 is formed with a through hole 502 corresponding to the hollow hole of the bearing housing 110 at the bearing assembly 100, as shown in FIG. 2.

The base plate 500 is formed with a lug 510 formed in a shape corresponding to the core 210 of the stator 200, and the lug 510 may take a semi-disk semi-circular shape when viewed in a top plane. Thus, foreign objects can be initially prevented by the lug 510 from entering an interior of the spindle motor through a bottom surface of the core 210.

The PCB 700 is arranged at an upper surface of the base plate 500, and is mounted with a variety of circuit elements, where the PCB 700 is electrically connected to the coil 220 which is a constituent element of the stator 200. The PCB 700 is formed with a through hole 505 for preventing an interference with the bearing housing 110. Size of the through hole 505 formed at the PCB 700 is larger than that of a through hole 502 formed at the base plate 505. The through hole 505 of the PCB 700 is partially opened and the opened portion of the through hole 505 may be formed with a curvature.

Referring to FIGS. 2 and 5, a bottom surface of the core 210 coupled to the bearing housing 110 of the bearing assembly 100 coupled to the base plate 500 is discrete from an upper surface of the base plate 500 at a predetermined gap, where various foreign objects such as dust, fine particles, oily dust and the like can be introduced into the base plate 500 and the bottom surface of the core 210, and the foreign objects can be attached to the core 210, the coil 220, the bearing and the magnet 420, and life of the spindle motor 800 can be greatly reduced by the foreign objects attached thereto.

In order to prevent the foreign objects from introducing into the gap between the upper surface of the base plate 500 and the bottom surface of the core 210, a partial area of the PCB 700 may be extended to be arranged on the lug 510 of the base plate 500.

In a case the PCB 700 covers the semi-disk lug 510 of the base plate 500, the gap between the upper surface of the base plate 500 and the bottom surface of the core 210 is reduced as much as thickness of the PCB 700 to decrease inflow of the foreign objects.

However, in a case the high-priced PCB 700 is unnecessarily extended to cover the lug 510 of the base plate 500, a manufacturing cost of the spindle motor 800 is inevitably increased.

In the exemplary embodiment of the present disclosure, the PCB 700 is formed with an exposure unit 710 that exposes the semi-disk lug 510 of the base plate 500 as illustrated in FIG. 5. The closed through hole 505 formed at the PCB 700 is opened by the exposure unit 710.

In the exemplary embodiment of the present disclosure, the frequently used "exposure unit" is defined by a portion exposing the base plate 500 that is formed by removing a part corresponding to a part opposite to the core 210 in the PCB 700 arranged on the base plate 500.

A portion corresponding to the semi-disk lug 510 is formed the by exposure unit with a void space not formed with the PCB 700. In a case the exposure unit 710 exposing a part of the semi-disk shaped lug 510 of the base plate opposite to the core 210 is formed on the PCB 700, an area of the PCB 700 is reduced whereby a manufacturing cost of the PCB 700 can be decreased but the foreign objects can be introduced in the spindle motor through the exposure unit 710.

In the exemplary embodiment of the present disclosure, in order to prevent the foreign objects from entering through the exposure unit 710 of the PCB 700 formed between the upper surface of the base plate 500 and the bottom surface of the core of the stator 200, a foreign object inflow prevention fence 520 is formed at the base plate 500.

The foreign object inflow prevention fence 520 is formed along an edge of the semi-disk shaped lug 510 and takes a shape of curved fence. A distal end of the curvature-shaped foreign object inflow prevention fence 520 is brought into contact with a distal end of the PCB 700 formed by the exposure unit 710, and the other distal end corresponding to the distal end of the foreign object inflow prevention fence 520 is brought into contact with the other distal end corresponding to the distal end of the PCB 700 formed by the exposure unit 710.

In the exemplary embodiment of the present disclosure, a height of the foreign object inflow prevention fence 520 may be substantially same as thickness of the PCB, for example. Alternatively, it should be apparent that the height of the foreign object inflow prevention fence 520 is greater than the thickness of the PCB.

The foreign object inflow prevention fence 520 may be erected at a right angle relative to the base plate 500. Alternatively, the foreign object inflow prevention fence 520 may be erected at an obtuse angle or an acute angle relative to the base plate 500.

In the exemplary embodiment of the present disclosure, the foreign object inflow prevention fence 520 may be formed by bending an edge of the semi-circular lug 510 of the base plate 500 to a direction facing the core 210. In the exemplary embodiment of the present disclosure, the foreign object inflow prevention fence 520 formed by bending the edge of the semi-circular lug 510 of the base plate 500 is formed in the shape of a curved plate.

Although a gap between the base plate 500 and the bottom surface of the core 210 of the stator 200 may increase by the PCB 700 formed with the exposure unit 710 for reducing the manufacturing cost, the foreign objects can be blocked by the foreign object inflow prevention fence 520 formed at the base plate 500 through the formation of the foreign object inflow prevention fence 520 formed at the base plate 500.

In the exemplary embodiment of the present disclosure, both distal ends of the foreign object inflow prevention fence 520 are brought into contact with the PCB 700, whereby inflow of foreign objects are prevented from entering a space formed between the distal end of the foreign object inflow prevention fence 520 and the PCB 700.

Although the exemplary embodiments of the present disclosure have illustrated and explained a structure in which a part of the base plate 500 is bent to form the foreign object inflow prevention fence 520, it should be apparent that the foreign object inflow prevention fence is alternatively formed by a synthetic resin material hardened along an upper edge of the lug 510 of the base plate 500 in a strip shape and coated on the base plate 500 using a dispenser. At this time, it should be apparent that the synthetic resin material has elasticity free from generating a static electricity, such that even if the synthetic resin material is brought into contact with the rotating yoke 410, no noise and damage can be generated.

Meanwhile, in order to prevent foreign objects such as dust introduced through the foreign object inflow prevention fence 520 from attaching to essential parts of the spindle motor despite the formation of the foreign object inflow prevention fence 520, a foreign object attachment member may be arranged at a rear surface of the foreign object inflow prevention fence to which foreign objects introduced into the foreign object inflow prevention fence are attached. The foreign object attachment member may include an adhesive material having viscosity to which foreign objects having passed the foreign object inflow prevention fence 520 are attached.

Meanwhile, the foreign object inflow prevention fence 520 preventing inflow of foreign objects may be manufactured with a synthetic resin material, and the foreign object inflow prevention fence 520 manufactured with the synthetic resin material may be attached to the base plate by an adhesive.

As apparent from the foregoing, the spindle motor according to the exemplary embodiments of the present disclosure has an industrial applicability in that an exposure unit is formed at a part of a PCB interposed between a base plate and a core of a stator to reduce a manufacturing cost of the PCB, and foreign objects introduced through the exposure unit is prevented by a foreign object inflow prevention fence formed at the base plate to avoid the spindle motor from being polluted by the foreign objects.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An optical disk drive including a spindle motor, the spindle motor comprising:
    a base plate;
    a bearing assembly coupled to the base plate;
    a rotation shaft rotationally coupled to the bearing assembly;
    a stator disposed on the base plate and comprising a core coupled to a periphery of the bearing assembly;
    a rotor comprising a yoke coupled to the rotation shaft and a magnet fixed to the yoke opposite to the core; and
    a printed circuit board (PCB) disposed between the base plate and the rotor,
    wherein the base plate comprises a fence along an outer peripheral edge thereof,
    wherein the fence is bent from, and monolithically formed with, a part of the base plate, and
    wherein the PCB is arranged on an upper surface of the base plate such that the base plate is exposed in a part opposite to the core.

2. The optical disk drive of claim 1, wherein the PCB is partially arranged on the base plate except for a region surrounded by the fence.

3. The optical disk drive of claim 1, wherein the PCB is provided with an exposure unit exposing a portion of the base plate opposite to the stator, and the fence inhibits foreign objects from entering the spindle motor through the exposure unit.

4. The optical disk drive of claim 1, wherein the PCB opposite to the stator is formed partially open at a position corresponding to the fence.

5. The optical disk drive of claim 1, wherein the fence takes a shape of a curved line when viewed from above the spindle motor.

6. The optical disk drive of claim 5, wherein the fence has the same curvature as that of the core of the stator.

7. The optical disk drive of claim 1, wherein the fence makes a right angle with the part of the base plate from which it is bent.

8. The optical disk drive of claim 1, wherein a height of the fence is greater than a thickness of the PCB.

9. The optical disk drive of claim 1, wherein the fence makes an obtuse angle with the part of the base plate from which it is bent.

10. The optical disk drive of claim 1, wherein the fence makes an acute angle with the part of the base plate from. Which it is bent.

11. The optical disk drive of claim 1, wherein the bearing assembly comprises a bearing housing and a bearing inserted into the bearing housing, and wherein the core of the stator comprises radially formed core pieces,
wherein the stator further comprises a coil wound on the core pieces,
wherein the magnet is opposite to the core pieces, and
wherein the rotation shaft is inserted into the bearing.

12. The optical disk drive of claim 1, wherein the fence is bent towards the rotor.

13. The optical disk drive of claim 1, wherein the fence takes a shape of an arc line when viewed from above the spindle motor.

14. The optical disk drive of claim 1, wherein the core extends outward, in a radial direction of the rotation shaft, from the periphery of the bearing assembly, and
wherein the fence is located further outward, in the radial direction, from the rotation shaft than the core is.

15. The optical disk drive of claim 1, wherein the yoke comprises a yoke upper plate and a yoke lateral plate, the yoke lateral plate comprising the magnet fixed thereon.

16. The optical disk drive of claim 15, wherein the spindle motor further comprises a suction magnet arranged on an inner surface of the yoke upper plate or an upper surface of the core opposite to the inner surface of the yoke upper plate.

17. The optical disk drive of claim 15, wherein the yoke upper plate takes a shape of a disk when viewed from above the spindle motor,
wherein the yoke upper plate is centrally formed with a cylindrically shaped yoke burring unit towards an upper surface of the yoke upper plate, and
wherein the yoke upper plate has a clamp disposed thereon, the clamp being configured to chuck an optical disk.

18. The optical disk drive of claim 1, wherein the bearing assembly comprises:
a bearing housing of a hollow hole-formed cylindrical shape, the bearing housing formed at an upper corner thereof with a staircase for fixing the stator; and
a bearing inserted into the bearing housing to accommodate the rotation shaft.

19. The optical disk drive of claim 18, wherein a bottom surface of the bearing housing comprises a coupling lug disposed thereon, the coupling lug being coupled to the base plate.

20. The optical disk drive of claim 18, wherein a bottom surface of the bearing housing comprises a support plate disposed thereon, the support plate supporting a bottom end of the rotation shaft, and
wherein the spindle motor further comprises a thrust bearing arranged between the support plate and the rotation shaft.

* * * * *